(12) United States Patent
Schneider et al.

(10) Patent No.: US 7,853,724 B2
(45) Date of Patent: Dec. 14, 2010

(54) AUTOMATIC IDENTIFICATION, NEGOTIATION, SYNCHRONIZATION, AND UPDATE OF SYSTEM INTERFACES

(75) Inventors: John C. Schneider, Bellevue, WA (US); Richard A. Rollman, Sammamish, WA (US); Alexander V. Ceponkus, Ancaster (CA); Derek E. Denny-Brown, II, Seattle, WA (US); Milen M. Nankov, Sammimish, WA (US)

(73) Assignee: AgileDelta, Inc., Bellevue, WA (US)

( * ) Notice: Subject to any disclaimer, the term of this patent is extended or adjusted under 35 U.S.C. 154(b) by 224 days.

(21) Appl. No.: 12/142,501

(22) Filed: Jun. 19, 2008

(65) Prior Publication Data

US 2009/0319594 A1      Dec. 24, 2009

(51) Int. Cl.
    *G06F 15/16*      (2006.01)
(52) U.S. Cl. .................. 709/250; 709/235; 707/601
(58) Field of Classification Search .......... 709/237, 709/250; 707/601
    See application file for complete search history.

(56) References Cited

U.S. PATENT DOCUMENTS

| | | | |
|---|---|---|---|
| 7,240,182 B2 * | 7/2007 | Day et al. | 712/34 |
| 7,287,252 B2 * | 10/2007 | Bussiere et al. | 717/176 |
| 2005/0240937 A1 * | 10/2005 | Bates et al. | 719/310 |
| 2007/0192351 A1 * | 8/2007 | Liu et al. | 707/102 |
| 2007/0239749 A1 * | 10/2007 | Farahbod | 707/101 |
| 2009/0248730 A1 * | 10/2009 | Burns | 707/102 |

* cited by examiner

*Primary Examiner*—Krisna Lim
(74) *Attorney, Agent, or Firm*—Schwabe, Williamson & Wyatt P.C.

(57) ABSTRACT

Methods, apparatuses, and articles for exchanging by a first computing device with a second computing device indicia of one or more interfacing definitions supported by at least one of the first computing device and the second computing device are described herein. In various embodiments, the first computing device may also facilitate communication with the second computing device based at least in part on said exchanging and on one or more priority rules. In some embodiments, the indications of the interfacing definitions may include a unique identifier for each interfacing definition. Other embodiments are also disclosed and described.

36 Claims, 5 Drawing Sheets

AUTOMATIC IDENTIFICATION, NEGOTIATION, SYNCHRONIZATION, AND UPDATE OF SYSTEM INTERFACES

STATEMENT REGARDING GOVERNMENT SPONSORED RESEARCH OR DEVELOPMENT

This invention was made with government support under contract FA8750-06-C-0038 awarded by The Air Force Research Lab. The government has certain rights in the invention.

TECHNICAL FIELD

Embodiments relate to the field of data processing, in particular, to interfacing definition identification, negotiation, synchronization, and update between computing devices.

BACKGROUND

With the advent of the Internet and other communication networks, communication between remotely disposed computing devices has become ubiquitous. Often, communication is in the form of a data representation language message, such as an Extensible Markup Language (XML) message. Devices often generate, process, validate, encode and decode such messages in accordance with interfacing definitions associated with the messages, such as XML schemas.

Interfacing definitions often change to meet evolving requirements. Also, different devices may utilize disparate interfacing definitions or differing versions of the same interfacing definition. These disparities in the interfacing definitions available to communicating devices requires manual configuration of the interfacing definitions used between every pair of communicating devices. Also, interfacing definitions are often locally modified, leading to confusion in determining whether two devices share a common interfacing definition. When the interface definitions are used to facilitate binary encoding, this can cause system failure (i.e., a system can't use a schema to decode the message that is different from the one used to encode it.)

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1A:
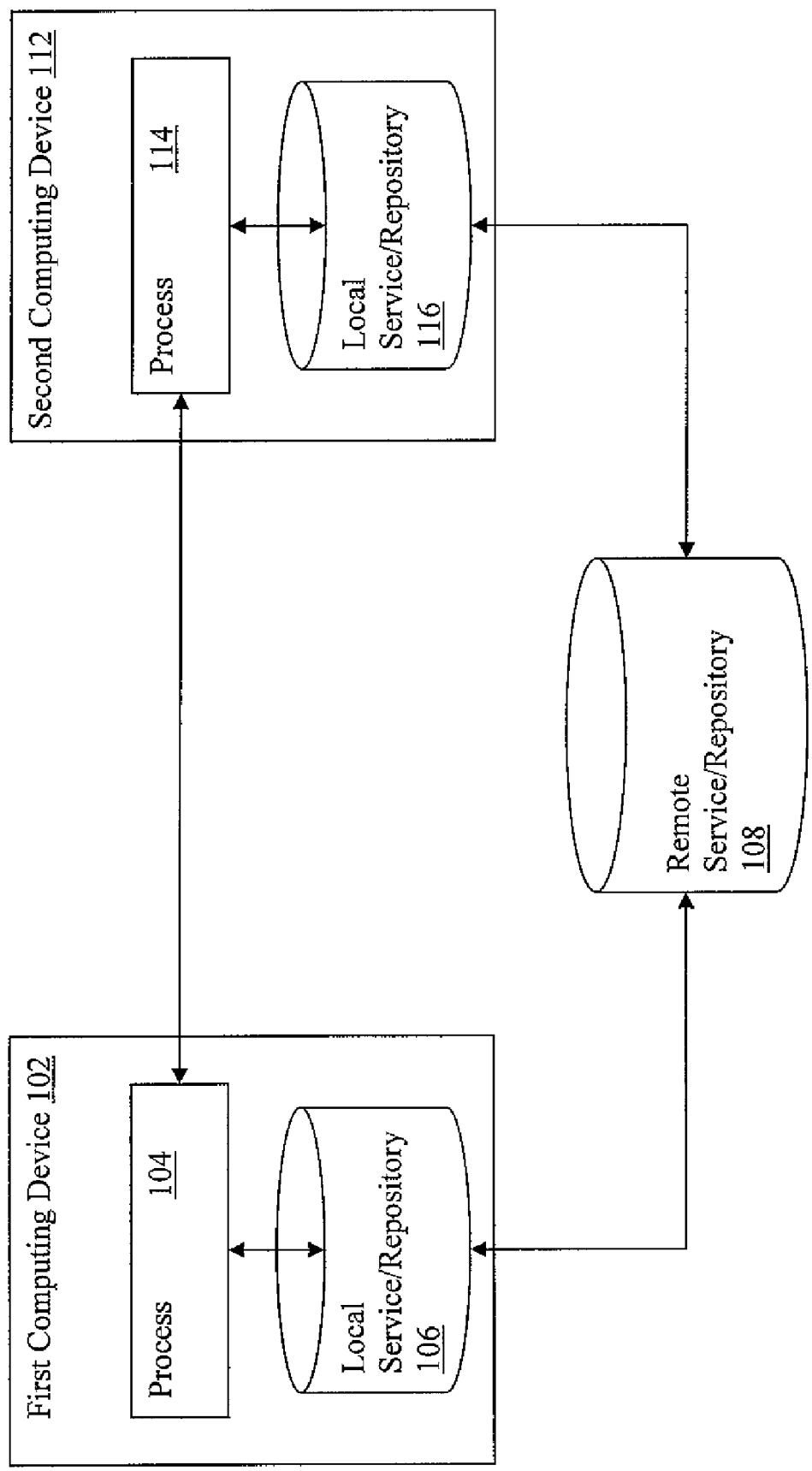
FIGS. 1a-1b illustrate an overview of various embodiments of the invention.

Illustrative embodiments include, but are not limited to, methods, apparatuses, and articles for exchanging by a first computing device with a second computing device indicia of one or more interfacing definitions supported by at least one of the first computing device and the second computing device. In various embodiments, the first computing device may also encode, in accordance with a selected interfacing definition, a message to be transmitted to the second computing device, the selected interfacing definition having been selected based at least in part on said exchanging and on one or more priority rules. In some embodiments, the indications of the interfacing definitions may include a unique identifier for each interfacing definition.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "interfacing definition", as used herein, is intended to cover a wide range of descriptions of types of data representation language messages. Interfacing definitions may be typically expressed in terms of constraints on the structure and content of messages of that type, providing a view of message types at relatively high levels of abstraction. Such interfacing definitions may be XML schemas, document type definitions (DTD), Interface Definition Languages (IDL), programming language types, or any other sort of description/definition. In one embodiment, the interfacing definitions may comprise portions or fragments of interfacing definitions rather than complete interfacing definitions.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1B:
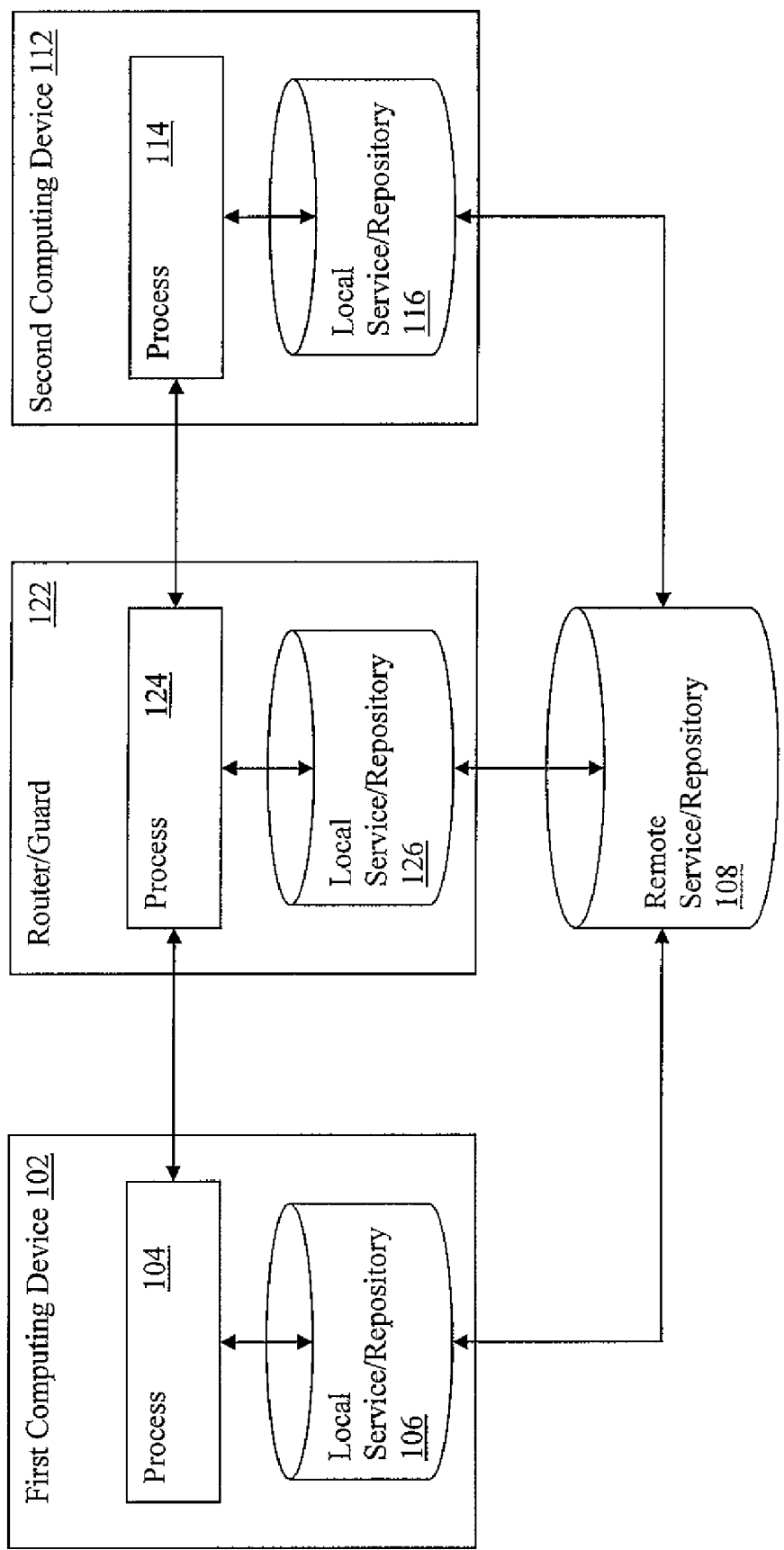

FIGS. 1a-1b illustrate an overview of various embodiments of the invention. As illustrated in FIG. 1a, first and second computing devices 102 and 112 may engage in interfacing definition negotiation and synchronization. Computing devices 102/112 may each have a process 104/114 capable of initiating an interfacing definition negotiation/exchange by determining locally available interfacing definitions and providing indicia of available interfacing definitions to another computing device 102/112. In one embodiment, process 104//14 may initiate an interfacing definition negotiation without providing any indicia of available interfacing definition, and may merely query the other computing device 102/112 to determine which interfacing definitions the other computing device 102/112 supports. The process 104/114 of the other computing device 102/112 may in turn indicate to the initiating computing device 102/112 a subset of the indicated interfacing definitions that are locally available to it, or indicate another locally available interfacing definition or definitions. In one embodiment, rather than indicating a subset, process 104/114 may indicate a superset, a non-intersecting set, or an empty set. The process 104/114 of the initiating computing device 102/112 may then select a best interfacing definition for use in facilitating communication with the other computing device 102/112, such as encoding messages to the other computing device 102/112. In some embodiments, if the best interfacing definition is not locally available to the initiating computing device 102/112, a local service/repository 106/116 of the computing device 102/112 may request the interfacing definition from a local service/repository 106/116 of the other computing device 102/112 or from some other remote service/repository 108. In various embodiments, processes 104/114 of computing devices 102/112 may further be capable of assigning and/or computing unique identifiers of the interfacing definitions to be used in the interfacing definition negotiation.

As further illustrated in FIG. 1*b*, in some embodiments a router or guard 122 may stand between first computing device 102 and second computing device 112. In various embodiments, router or guard 122 may be any sort of intermediary device through which communication between the first and second computing devices 102/112 may occur. In one embodiment, multiple routers or guards 122 may stand between first computing device 102 and second computing device 112. In some embodiments, each of computing devices 102/112 may separately engage in interfacing definition negotiation/exchange with router/guard 122, the router/guard 122 having a process 124 and local service/repository 126 capable of performing the operations of processes 104/114 and local services/repositories 106/116. In other embodiments, the router or guard 122 may instead only filter out the interfacing definitions that router or guard 122 doesn't support in an exchange of interfacing definition indicia between first computing device 102 and second computing device 112.

Figure 4:
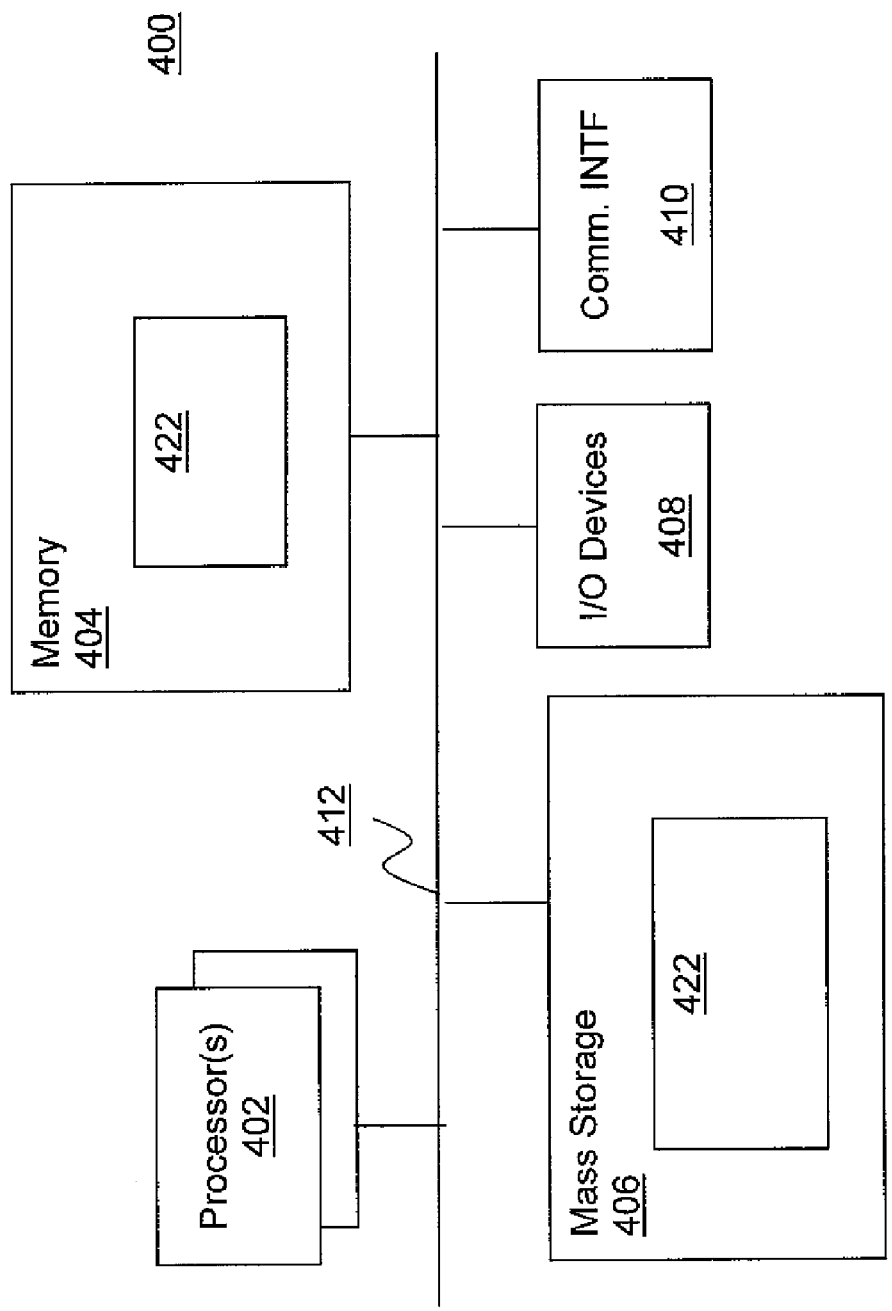
FIG. 4 illustrates an example computer system suitable for use to practice aspects of various embodiments.

In various embodiments, the computing devices 102/112 may be any sort of computing devices 102/112 known in the art, except for processes 104/114 and local services/repositories 106/116. The computing devices 102/112 may be personal computers (PC), workstations, servers, routers, mainframes, modular computers within blade servers or high-density servers, personal digital assistants (PDA), entertainment centers, set-top boxes, or mobile devices. An exemplary computing device 102/112 is illustrated by FIG. 4, and will be described in greater detail below. In some embodiments, one of computing devices 102/112 may be a client initiating an interfacing negotiation with a server, and the other computing device 102/112 may be that server. In other embodiments, one of computing devices 102/112 may be a publisher initiating an interfacing negotiation with a subscriber, and the other computing device 102/112 may be that subscriber.

As mentioned above, each computing device 102/112 may have a process 104/114. In various embodiments, processes 104/114 may be stand-alone programs or plug-ins to other programs, such as plug-ins to web clients, including browsers, and/or web servers to enable the other programs to facilitate communication with and between other programs. In some embodiments, in addition to performing the operations described above and below, processes 104/114 may be encoders/decoders of binary XML messages. In some embodiments, the processes 104/114 may use compiled versions of the interfacing definitions to encode messages as binary XML or to decode such messages. In such embodiments, the compiled versions of interfacing definitions may also be exchanged between local repositories 106 and 116 and remote service/repository 108 to optimize the distribution of the interfacing definitions. In some embodiments, such encoder/decoder processes 104/114 may further be capable of encoding or decoding without interfacing definitions, of compressing/decompressing a stream of data, and/or of multiplexing/combining a stream of data. Such capabilities are discussed in greater detail in U.S. patent application Ser. No. 11/394,662, entitled "Knowledge Based Encoding of Data" and filed on Mar. 31, 2006, in U.S. patent application Ser. No. 11/398,112, entitled "Multiplexing Binary Encoding to Facilitate Compression" and filed on Apr. 5, 2006, and in U.S. patent application Ser. No. 11/861,988, entitled "Knowledge Based Encoding of Data with Multiplexing to Facilitate Compression" and filed on Sep. 26, 2007. Those applications are hereby fully incorporated herein by reference.

In various embodiments, the local service/repositories 106/116 of computing devices 102/112 may each comprise at least partially a database, file system or some other form of data store. Such a database, file system or data store may include a relational database, a normalized database, a de-normalized database, an unstructured file, or any sort of storage format known in the art. Local services/repositories 106/116 may store all or a portion of the locally available interfacing definitions, or may simply store locators to the interfacing definitions. As further mentioned above and below, local services/repositories 106/116 may communicate with each other in a peer-to-peer manner and/or with one or more remote repositories configured in a centralized, federated or hierarchical manner to obtain and/or provide interfacing definitions.

In some embodiments, remote service/repository 108 may also at least partially comprise a database, file system or some other form of data store. Such a database, file system or data store may include a relational database, a normalized database, a de-normalized database, an unstructured file, or any sort of storage format known in the art. In some embodiments, remote service/repository 108 may comprise a database server, file system server, or cluster of servers. In one embodiment, remote service/repository 108 may be a central repository that other repositories 106/116 consult with. In other embodiments, remote service/repository 108 may belong to a federated set of repositories that share interfacing definitions with each other. In one such other embodiment, the federated repositories may be organized in a hierarchy, for example, with a local repository 106/116 consulting remote service/repository 108, which in turn may consult a regional repository, which may then consult a national repository, and so on until either the desired interfacing definition is found or the highest level repository is determined not to have the sought interfacing definition. In one embodiment, remote service/repository 108 may store a superset of the interfacing definitions of computing devices 102/112 and of other computing devices. Also, as described in greater detail below, remote service/repository 108 may periodically provide computing devices 102/112 with new or updated interfacing definitions and may answer queries from computing devices 102/112 attempting to determine if a new interfacing definition is available or whether a known interfacing definition has changed. In some embodiments, remote service/repository 108 may simply allow computing devices 102/112 to fetch, without any sort of query, copies of interfacing definitions any time that a local time-to-live for an interfacing definition has expired.

In some embodiments, computing devices 102/112 may be communicatively coupled by a local bus, or a networking fabric (not illustrated) such as a local area network (LAN), a wide area network (WAN), or the Internet. Computing devices 102/112 may belong to the same enterprise, different enterprises, or no enterprise at all. In various embodiments, computing devices 102/112 may use any messaging protocol known in the art, such as the Hypertext Transfer Protocol (HTTP) for exchanging messages, and any communication protocol known in the art, such as TCP/IP, to enable communication.

In various embodiments, when a computing device 102/112 receives a new or updated interfacing definition, the local service/repository 106/116 (or the process 104/114 associated with the local service/repository 106/116) of the computing device 102/112 may assign or compute a unique identifier for the interfacing definition. The interfacing definition may already be associated with some other sort of identifier, such as a file name or URL, but inconsistencies in file names of the same interfacing definition across multiple computing devices 102/112 lead to the need for a unique identifier. Upon receiving the new or updated interfacing definition, the local service/repository 106/116 may, in some embodiments, first process or canonicalize (hereinafter "process") the interfacing definition to create a canonical form of the interfacing definition to be used to facilitate determining equivalence between interface definitions. In various embodiments, the canonical form may comprise a set of abstract content models, grammars or finite automata (FA). And in some embodiments, the canonical form might be a compiled interfacing definition, such as the compiled knowledge representations discussed in U.S. patent application Ser. No. 11/394,662, which is cited in full above. Also, in some embodiments, the canonical form may include or represent one or more of element identifiers, attributes, namespaces, entity references, or tags. Other portions of the interfacing definition, such as comments, may be not be considered significant in determining interface definition equivalence, and thus may be excluded from the canonical form. Also, in some embodiments, the processing may comprise determining by process 104/114 whether the interfacing definition references one or more external interfacing definitions directly or indirectly. If it references other external interfacing definitions, process 104/114 may create a set of abstract content models, grammars or finite-automata, such as those described above, representing both the internal and external interfacing definitions and may identify portions in the abstract content models, grammars or finite-automata representing both the internal and external interfacing definitions to be used in facilitating communication. Further, in some embodiments, either before or after processing the interfacing definition, process 104/114 may sort portions of the interfacing definition to eliminate the possibility of order differences between interfacing definitions that are otherwise equivalent.

In some embodiments, the process 104/114 may then assign a unique identifier for the new or updated interfacing definition based on the canonical form, the unique identifier being capable of being provided to another computing device 102/112 to identify the interfacing definition to the other computing device 102/112. In various embodiments, the assigning may further comprise computing, by local service/repository 106/116 or process 104/114, the unique identifier based on the canonical form. In some embodiments, local service/repository 106/116 or process 104/114 may compute the unique identifier by computing a hash of the canonical form using a hash function. Also, in some embodiments where the interfacing definition references another external interfacing definition, the computing may comprise computing a unique identifier for the canonical form representing both interfacing definitions. Further, in various embodiments, the unique identifier may be 64 bits or 128 bits in size, but the unique identifier may have any other size, and the size of the identifier may vary from embodiment to embodiment.

In various embodiments, as mentioned above, a process 104/114 of a computing device 102/112 may initiate interfacing definition negotiation/exchange by determining which interfacing definitions are locally available to the computing device 102/112 and indicating those interfacing definitions to another computing device 102/112 as being available. To determine which interfacing definitions are locally available, the process 104/114 may query a local service/repository 106/116 of the computing device 102/112 for all or a particular set of interfaces. The local service/repository 106/116 may in turn indicate to the process 104/114 which interfacing definitions are available. If some of the requested interfacing definitions are not available, local service/repository 106/116 may obtain one or more interfacing definitions in the manner described further below. In one embodiment, prior to sending indications of available interfacing definitions, process 104/114 may apply selection criteria, such as the priority rules described below, to select a subset of the available interfacing definitions. In other embodiments, process 104/114 may indicate every available interfacing definition. In such other embodiments, process 104/114 may optionally provide the indications of interfacing definitions in priority order or provide an additional indication of priority for the recipient to consider. In providing indications of available interfacing definitions to another computing device 102/112, the process 104/114 may, in some embodiments, provide the indications in a header field of an HTTP message. Also, in some embodiments, process 104/114 may provide an additional indication that computing device 102/112 is capable of retrieving additional interfacing definitions. Further, in various embodiments, the indications may identify the interfacing definitions using the above-described unique identifiers.

In some embodiments, as mentioned above, another computing device 102/112 may receive indications of supported/available interfacing definitions from a computing device 102/112 that is initiating interfacing definition negotiation. In various embodiments, upon receiving the indications, a process 104/114 of the other/receiving computing device 102/112 may query a local service/repository 106/116 of the receiving computing device 102/112 for the interfacing definitions indicated by the initiating computing device 102/112. In some embodiments, if the indications include an indication that the initiating computing device 102/112 may retrieve additional interfacing definitions, the process 104/114 of the receiving computing device 102/112 may further query the local service/repository 106/116 for any other interfacing definitions. In one embodiment, if the received indications are ordered by priority or include an indication of priority ordering, the process 104/114 of the receiving computing device 102/112 may query the local service/repository 106/116 for the interfacing definitions in the received/indicated priority ordering.

In various embodiments, prior to making the query, the process 104/114 of the receiving computing device 102/112 may first determine the priorities of the indicated interfacing definitions based on priority rules or priorities indicated by initiating device, in the manner described below. The process 104/114 may then query the local service/repository 106/116 for each indicated interfacing definition separately, in order of priority. Thus, process 104/114 may query for the highest priority interfacing definition first and the lowest priority last, with what is considered "highest priority" and "lowest priority" varying from embodiment to embodiment. As soon as process 104/114 receives a response from local service/repository 106/116 indicating that an interfacing definition is available, process 104/114 may stop querying and may provide the initiating computing device 102/112 with an indication of the available interfacing definition. In other embodiments, rather than determining priorities of the indicated interfacing definitions, process 104/114 may simply query local service/repository 106/116 for all, a subset, a superset, or an empty set of the indicated interfacing definitions. The local service/repository 106/116 may then respond to the query by indicating all, a subset, a superset, or an empty set of the queried interfacing definitions based on priority or local availability to the receiving computing device 102/112. The interfacing definitions provided in the response to the query may comprise interfacing definitions that are available to both computing devices 102/112. In other embodiments, where the initiating computing device 102/112 indicated the ability to retrieve additional interfacing definitions, process 104/114 may query the local service/repository 106/116 for other interfacing definitions not indicated by the initiating computing device 102/112.

In some embodiments, if some or all of the indicated interfacing definitions are not locally available to the receiving computing device 102/112, the local service/repository 106/116 of the receiving computing device 102/112 may retrieve one or more of the indicated interfacing definitions. Local service/repository 106/116 may attempt to fetch the interfacing definitions from the local service/repository 106/116 of the initiating computing device 102/112 in a peer-to-peer fashion or may attempt to fetch the interfacing definitions from remote service/repository 108 (which may in turn consult yet other repositories, forming a hierarchy, as discussed above).

In various embodiments, once process 104/114 has received a response from its query for interface definitions, process 104/114 may respond to the initiating computing device 102/112 by indicating the mutually available/supported and/or other interfacing definitions to the initiating computing device 102/112. In some embodiments, the process 104/114 may provide the indications in a header field of an HTTP message. Further, in various embodiments, the indications may identify the interfacing definitions using the above-described unique identifiers.

In some embodiment, as mentioned above, when the initiating computing device 102/112 receives indications from the other/receiving computing device 102/112, the process 104/114 of the initiating computing device 112 may select a "best" or "highest priority" interfacing definition indicated by the other computing device 102/112, with what is "best" or "highest priority" varying from embodiment to embodiment. In one embodiment, the initiating computing device 102/112 may select more than one best/highest priority interfacing definition. In some embodiments, process 104/114 may select the best/highest priority interfacing definition(s) based on one or more priority rules. The priority rules may apply any possible standard for comparison of the interfacing definitions. In some embodiments, such priority rules may be set forth in a configuration file and may be configurable/adjustable by a user or process to suit varying needs. In various embodiments, priority rules may include at least one of most recently modified interfacing definition(s), association(s) of interfacing definition(s) with priority system(s), most recently received interfacing definition(s), or a user-configured priority.

In various embodiments, if the other/receiving computing device 102/112 indicated interfacing definitions that are not locally available to the initiating computing device 102/112, the local service/repository 106/116 of the initiating computing device 102/112 may retrieve the interface definitions that are not available. In some embodiments, local service/repository 106/116 may only retrieve an interfacing definition that the initiating computing device 102/112 determined to be the best/highest priority interfacing definition. In various embodiments, the local service/repository 106/116 may retrieve the interfacing definitions in the manner described above, by attempting to retrieve the interfacing definitions in a peer-to-peer, hierarchical, or centralized fashion from the local service/repository 106/116 of the other/receiving computing device 102/112 or from remote service/repository 108.

In some embodiments, as described above, after selecting the best/highest priority interfacing definition(s), the process 104/114 of the initiating computing device 102/112 may encode a message to the other/receiving computing device 102/112 in accordance with the selected interfacing definition(s). In various embodiments, as mentioned, process 104/114 may be an encoder capable of encoding the message as binary XML in accordance with the selected interfacing definition(s). In some embodiments, a header of the message, such as an HTTP header, a binary XML header, or both, may include fields identifying the selected interfacing definition(s) as the interfacing definition(s) used for encoding. In some embodiments, a header message may indicate a response interfacing definition to be used by the system responding to the message if the response will be processed by a third computing device that does not have access to the selected interfacing definition(s) or which prefers the response interfacing definition. The process 104/114 may select the response interfacing definition in the same or a similar manner to the above described manner of selecting the best/highest priority interfacing definition(s). After encoding the message, the initiating computing device 102/112 may send it to the other/receiving computing device 102/112.

In various embodiments, the other/receiving computing device 102/112 may reply to the initiating computing device 102/112, encoding the reply in accordance with the selected interfacing definition(s) or the response interfacing definition if the selected interfacing definition is unavailable. The reply message may also indicate in a header field, such as an HTTP header, a binary XML header, or both, which interfacing definition was used to encode the message.

In some embodiments, each computing device 102/112 may periodically receive updated or new interfacing definitions from remote service/repository 108. For example, computing devices 102/112 may receive updated interfacing definitions from the remote service/repository 108 whenever the remote service/repository 108 pushes out new/updated interfacing definitions to computing devices 102/112. Such new/updated interfacing definitions may be received and stored by local services/repositories 106/116. Upon receiving the interfacing definitions, computing devices 102/112 may assign or compute a unique identifier for them, as described above. In various embodiments, each local service/repository 106/116 of each computing device 102/112 may retrieve updated or replacement interfacing definition(s) the remote service/repository 108 when a time-to-live for one of the interfacing definitions expires, thus ensuring that the stored interfacing definitions are up to date.

In various embodiments, when computing devices 102/112 receive a new or updated interfacing definition, as mentioned above, processes 104/114 may determine based on the priority rules, in the manner described above, if the new/updated interfacing definition would be selected instead of the above-mentioned selected interfacing definition. If the new interfacing definition would be selected, the processes 104/114 may then repeat the interfacing definition negotiation/exchanging described above, including indicating the new interfacing definition as an available interfacing definition. Alternatively, the local service/repository 106/116 may simply use the new version instead of the old version in all future negotiations. It could still support the old version if the other computing device 102/112 prefers it, but it may omit it from its preferred list.

In some embodiments, the above described interfacing definition negotiation may be used to validate that a message/document conforms to an interfacing definition. Also, the negotiated interfacing definitions may be use to facilitate creation, editing and processing of messages/documents as well.

Figure 2:
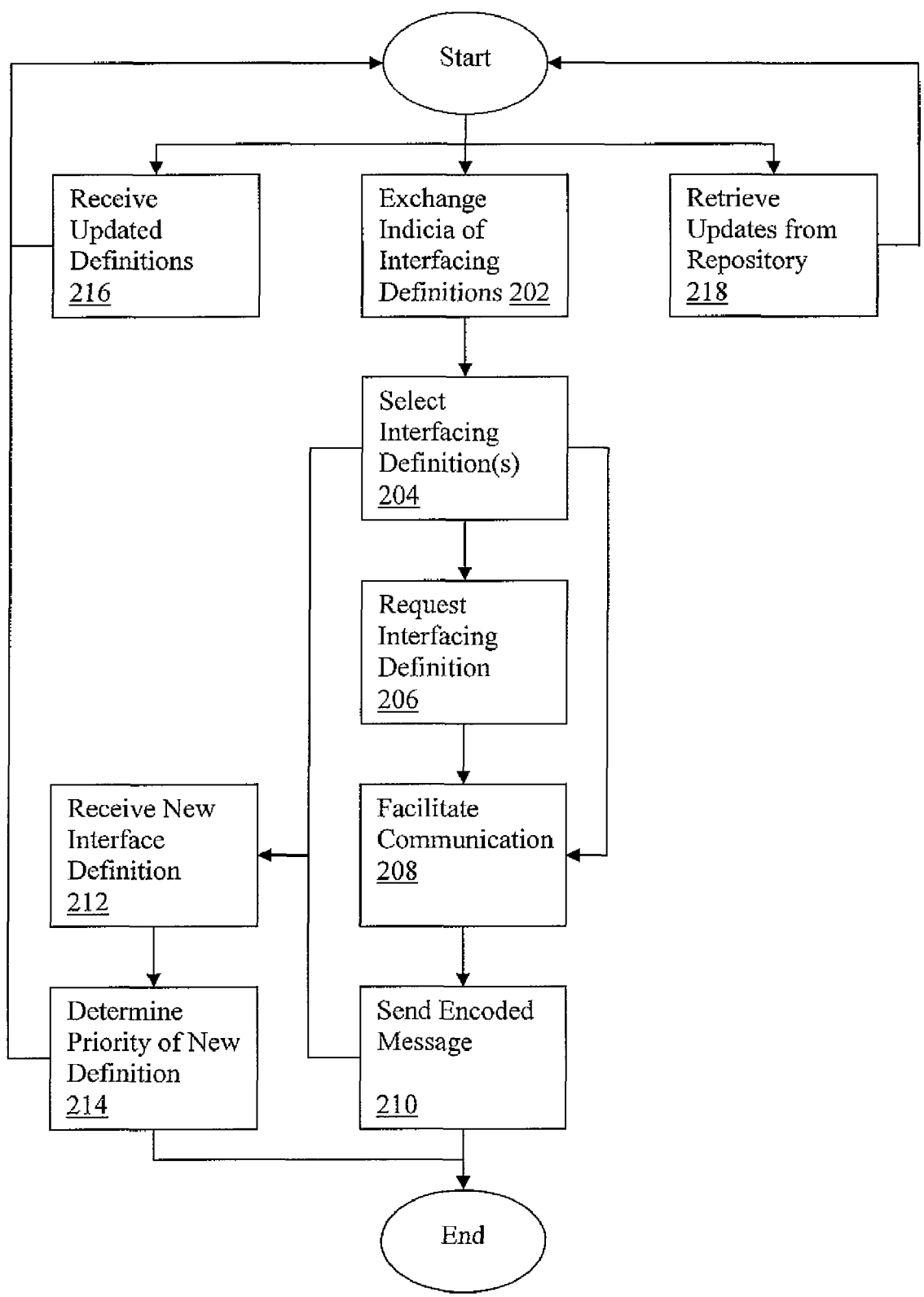
FIG. 2 illustrates a flow chart view of selected operations of the methods of various embodiments of the invention.

FIG. 2 illustrates a flow chart view of selected operations of the methods of various embodiments. As illustrated, a first computing device may exchange with a second computing device indicia of one or more interfacing definitions supported by at least one of the first computing device and the second computing device, block 202. In one embodiment, the indications of the interfacing definitions may include a unique identifier for each interfacing definition. Also, in one embodiment, the interfacing definitions may comprise portions of interfacing definitions. In some embodiments, the exchanging may include indicating, by the first computing device, an ability of the first computing device to retrieve additional interfacing definitions.

In various embodiments, the exchanging, block 202, may further comprise indicating, by the first computing device, to the second computing device, first one or more interfacing definitions supported by the first computing device and receiving, in response, by the first computing device, from the second computing device, indicia of second one or more interfacing definitions supported by the second computing device. In some embodiments, the indicia of first and/or second one or more interfacing definitions are filtered by an intermediary device in transmission of the indicia between the first and second computing devices, the intermediary device excluding indicia of interfacing definitions not supported by the intermediary device. The first computing device may then select one or more of the second interfacing definitions, block 204, based on one or more priority rules. In some embodiments, the priority rules may include at least one of a most recently modified interfacing definition having a highest selection priority relative to other interfacing definitions, an association of an interfacing definition with a priority system, a most recently received interfacing definition having a highest selection priority relative to other interfacing definitions, or a user-configured selection priority.

In other embodiments, the exchanging, block 202, may further comprise receiving, by the first computing device, an indication from the second computing device of first one or more interfacing definitions supported by the second computing device. The first computing device may then determine second one or more interfacing definitions supported by the first computing device, the second interfacing definitions including all, a subset, a superset, or an empty set of the first interfacing definitions and/or other interfacing definitions, and provide indications of the second interfacing definitions to the second computing device. In such embodiments, the first computing device may, after said determining, select one of the second interfacing definitions based on one or more priority rules, block 204, and provide only the selected second interfacing definition to the second computing device.

As is further shown, a local service of the first computing device may then request at least one of the interfacing definitions, block 206, if the at least one interfacing definition is not supported by the first computing device. In some embodiments, the requesting, block 206, may comprise requesting, of a local service of the second computing device, the at least one interfacing definition. In other embodiments, the requesting, block 206, may comprise requesting, of a remote service/repository, the at least one interfacing definition. Also, the first computing device may receive one or more updated interfacing definitions from the remote service/repository pushed to the first computing device by the remote service/repository, block 216. Also, the first computing device may retrieve from the remote service/repository, an updated, modified, or replacement interfacing definition update when time-to-live for one of the interfacing definitions expires, block 218.

In various embodiments, the first computing device may then facilitate communication with the second computing device, block 208, based at least in part on said exchanging and on one or more priority rules. In some embodiments, the facilitating, block 208, may comprise facilitating communication with the second computing device in accordance with one or more selected interfacing definitions, the one or more selected interfacing definitions having been selected based at least in part on said exchanging and on one or more priority rules. In some embodiments, the facilitating may comprise encoding, in accordance with the selected interfacing definition(s), a message to be transmitted to the second computing device. The first computing device may then send to the second computing device the encoded message, block 210, the message including a field indicating that the selected interfacing definition(s) was/were used for encoding the message. In some embodiments, the message may be encoded as binary XML. In one embodiment, the first computing device may facilitate communication with the second computing device without any selected interfacing definitions if no interfacing definitions are available to both the first and second computing devices.

As illustrated, the first computing device may also receive a new interfacing definition, block 212, determine, for example based on the priority rules, if the new interfacing definition would be selected, block 214, and, if the new interfacing definition would be selected, repeat said exchanging, block 202, including indicating the new interfacing definition.

Figure 3:
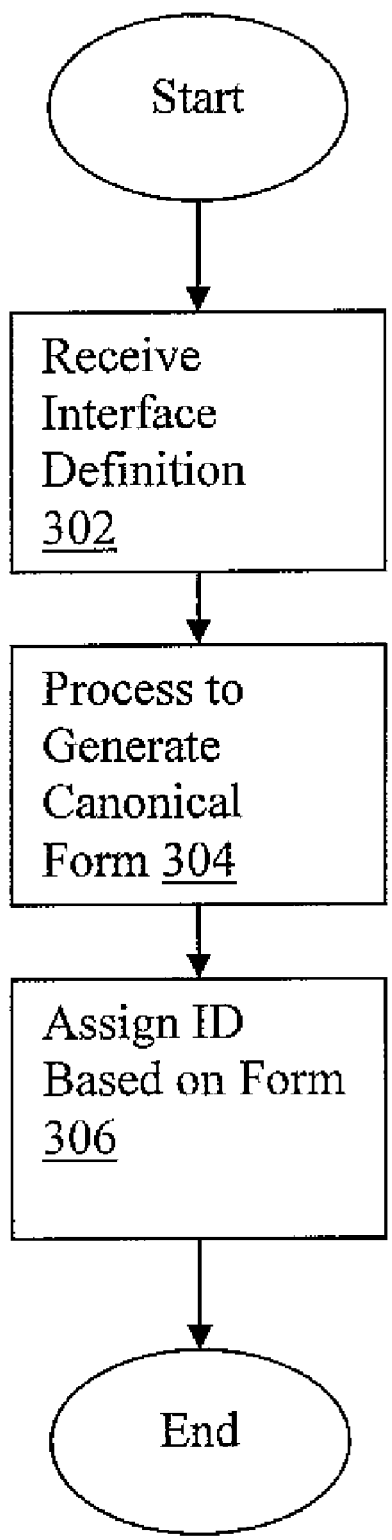
FIG. 3 illustrates a flow chart view of selected operations of the methods of various embodiments of the invention.

FIG. 3 illustrates a flow chart view of selected operations of the methods of various embodiments. As illustrated, a computing device may receive an interfacing definition for use in facilitating communication, such as encoding or decoding a message as binary XML, block 302. In various embodiments, the computing device may then process the interfacing definition to generate a canonical form of the interfacing definition, block 304. In one embodiment, the canonical form may include one or more of element identifiers, attributes, namespaces, entity references, or tags. In some embodiments, the canonical form may comprise a set of abstract content models, grammars or finite automata. In some embodiments, the processing may comprise determining whether the interfacing definition references another external interfacing definition, directly or indirectly. If it references other external interfacing definitions, the computing device may create a canonical form representing both the internal and external interfacing definitions.

As is further shown, the computing device may then assign a unique identifier for the interfacing definition based at least in part on the canonical form, the unique identifier to be provided to another computing device to identify the interfacing definition to the other computing device. In some embodiments, the assigning may comprise computing a hash of the canonical form using a hash function. Also, in some embodiments, where the interfacing definition references other external interfacing definitions, the computing may comprise computing a unique identifier for the canonical form representing both the internal and external interfacing definitions.

FIG. 4 illustrates an example computer system suitable for use to practice aspects of various embodiments. As shown, computing system 400 includes a number of processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM), a disc storage device, and so forth), input/output devices 408 (such as display, keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing one or more aspects of the above described teachings to practice the various embodiments of the invention, herein collectively denoted as 422. The various components may be implemented by assembler instructions supported by processor(s) 402 or high-level languages, such as, for example, C, that can be compiled into such instructions.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments. This application is intended to cover any adaptations or variations of the embodiments discussed herein. Therefore, it is manifestly intended that the embodiments be limited only by the claims and the equivalents thereof.

What is claimed is:

1. A method comprising:
exchanging, by a first computing device with a second computing device indicia of one or more interfacing definitions supported by at least one of the first computing device and the second computing device; and
facilitating, by the first computing device, communication with the second computing device based at least in part on said exchanging and on one or more priority rules;
wherein each interfacing definition includes one or more data types allowed in a data representation language; and
wherein each data type includes one or more structural or content constraints on a message written in the data representation language.

2. The method of claim 1, wherein the exchanging comprises
indicating, by the first computing device, to the second computing device, first one or more interfacing definitions supported by the first computing device; and
receiving, in response, by the first computing device, from the second computing device, indicia of second one or more interfacing definitions supported by the second computing device.

3. The method of claim 2, wherein the indicia of first and/or second one or more interfacing definitions are filtered by an intermediary device in transmission of the indicia between the first and second computing devices, the intermediary device excluding indicia of interfacing definitions not supported by the intermediary device.

4. The method of claim 2, further comprising selecting, by the first computing device, one of the second interfacing definitions based on one or more priority rules as the selected interfacing definition.

5. The method of claim 1, wherein the exchanging comprises:
receiving, by the first computing device, indicia from the second computing device of first one or more interfacing definitions supported by the second computing device;
determining, by the first computing device, second one or more interfacing definitions supported by the first computing device, the second interfacing definitions including all, a subset, a superset, or an empty set of the first interfacing definitions and/or other interfacing definitions; and
providing, by the first computing device, one or more indications of the second one or more interfacing definitions to the second computing device.

6. The method of claim 5, further comprising, after said determining, selecting by the first computing device at least one of the second one or more interfacing definitions based on one or more priority rules, and wherein providing comprises providing only the selected at least one of the second one or more interfacing definitions to the second computing device.

7. The method of claim 1, further comprising requesting from one or more local or remote sources, by a local service of the first computing device, at least one additional interfacing definition, if the at least one exchanged interfacing definition is not supported by the first computing device.

8. The method of claim 7, wherein the requesting comprises requesting, of a local service of the second computing device, the at least one additional interfacing definition.

9. The method of claim 7, wherein the requesting comprises requesting, of a remote repository, the at least one additional interfacing definition.

10. The method of claim 9, further comprising receiving, by the first computing device, one or more updated interfacing definitions from the remote repository pushed to the first computing device by the remote repository.

11. The method of claim 9, further comprising retrieving, by the first computing device, from the remote repository, an updated, modified, or replacement interfacing definition update when a time-to-live for one of the interfacing definitions expires.

12. The method of claim 1, wherein said facilitating comprises facilitating communication with the second computing device in accordance with one or more selected interfacing definitions, the one or more selected interfacing definitions having been selected based at least in part on said exchanging and on one or more priority rules.

13. The method of claim 12, wherein the facilitating comprises encoding, in accordance with the one or more selected interfacing definitions, a message to be transmitted to the second computing device.

14. The method of claim 13, further comprising sending, by the first computing device to the second computing device, the encoded message, the encoded message including a field indicating that the selected interfacing definition was used for encoding the message.

15. The method of claim 14, wherein the message is encoded as binary XML.

16. The method of claim 1, wherein the one or more priority rules include at least one of a most recently modified interfacing definition having a highest selection priority relative to other interfacing definitions, an association of an interfacing definition with a priority system, a most recently received interfacing definition having a highest selection priority relative to other interfacing definitions, or a user-configured selection priority.

17. The method of claim 1, wherein the exchanging includes indicating, by the first computing device, an ability of the first computing device to retrieve additional interfacing definitions.

18. The method of claim 1, wherein the one or more interfacing definitions comprise portions of interfacing definitions.

19. The method of claim 1, wherein at least one of the indicia of the interfacing definitions includes a unique identifier for the interfacing definition.

20. The method of claim 1, further comprising:
receiving, by the first computing device a new interfacing definition;
determining by the first computing device, based on the priority rules, whether the new interfacing definition should be selected; and
if the new interfacing definition should be selected, repeating said exchanging with the second computing device, including indicating for the second computing device that the new interfacing definition is now supported by the first computing device.

21. The method of claim 1, further comprising facilitating communication with the second computing device without any selected interfacing definitions if no interfacing definitions are available to both the first and second computing devices.

22. A method comprising:
receiving, by a computing device, an interfacing definition for use in encoding or decoding a message as binary XML;
processing, by the computing device, the interfacing definition to generate a canonical form of the interfacing definition to be used in encoding or decoding a binary XML message; and
assigning, by the computing device, a unique identifier for the processed interfacing definition based at least in part on the canonical form, the unique identifier to be provided to another computing device to identify the interfacing definition to the other computing device;
wherein each interfacing definition includes one or more data types allowed in binary XML; and
wherein each data type includes one or more structural or content constraints on messages written in binary XML.

23. The method of claim 22, wherein assigning further comprises computing a hash of the canonical form using a hash function.

24. The method of claim 22, wherein the processing comprises:
determining whether the interfacing definition references another external interfacing definition, directly or indirectly; and
if the interfacing definition references another external interfacing definition, creating the canonical form to represent both interfacing definitions; and
wherein computing comprises computing a unique identifier for the canonical form representing both interfacing definitions.

25. The method of claim 22, wherein the canonical form includes one or more of element identifiers, attributes, namespaces, entity references, or tags.

26. The method of claim 22, wherein the canonical form comprises a set of abstract content models, grammars or finite automata.

27. A computing device comprising:
a processor;
a mass storage device coupled to the processor; and
a plurality of executable programming instructions stored on the mass storage device and configured to be executed by the processor to implement:
an interfacing definition collection module configured to receive from an other computing device an indication of first one or more interfacing definitions supported by the other computing device;
an interfacing definition determination module configured to determine second one or more interfacing definitions supported by the computing device; and
an interfacing definition providing module configured to provide indications of the second interfacing definitions to the other computing device;
wherein the second one or more interfacing definitions include all, a subset, a superset, or an empty set of the first one or more interfacing definitions;
wherein each interfacing definition includes one or more data types allowed in a data representation language; and
wherein each data type includes one or more structural or content constraints on a message written in the data representation language.

28. The computing device of claim 27, wherein the interfacing definition determination module is further configured to request the first one or more interfacing definitions from a local service of the computing device.

29. The computing device of claim 28, wherein the interfacing definition determination module is configured to request the first one or more interfacing definitions from a local service of the computing device; and
wherein the requesting the first interfacing definition includes:
determining priorities of the first interfacing definitions;
requesting one of the first interfacing definitions with a highest priority; and
requesting another of the first interfacing definitions with a lower priority if the highest priority first interfacing definition is unavailable.

30. The computing device of claim 28, wherein the interfacing definition determination module is configured to request the first one or more interfacing definitions from a local service of the computing device, and further configured to request the first one or more interfacing definitions and other available definitions.

31. An article of manufacture comprising:
a storage medium; and
a plurality of executable programming instructions stored on the storage medium and configured to program a computing device to:
indicate to an other computing device, first one or more interfacing definitions supported by the computing device, receive in response, from the other computing device, indication of second one or more interfacing definitions supported by the other computing device, and select one of the other interfacing definitions based on one or more priority rules for use to facilitate communication with the other computing device;

wherein each interfacing definition includes one or more data types allowed in a data representation language; and wherein each data type includes one or more structural or content constraints on a message written in the date representation language.

32. The article of claim 31, wherein the plurality of executable programming instructions are further configured to program the computing device with a local service to request at least one of the second one or more interfacing definitions if the second one or more interfacing definitions are not supported by the computing device.

33. The article of claim 31, wherein the plurality of executable programming instructions are further configured to:

program the computing device to enable the computing device to encode a message in accordance with the selected interfacing definition; and send the encoded message to the second computing device;

wherein the encoded message includes a field indicating that the selected interfacing definition was used to encode the message.

34. The article of claim 31, wherein the plurality of executable programming instructions is further configured to program the computing device to enable the computing device to:

receive a new interfacing definition;

determine, based on the priority rules, if the new interfacing definition should be selected;

include the new interfacing definition if the new interfacing definition is selected, in the first one or more interfacing definitions supported by the computing device; and indicate, to the other computing device, the first one or more interfacing definitions supported by the computing device.

35. A computing device comprising:

a processor;

a repository for storing interfacing definitions; and a plurality of executable programming instructions associated with the repository and operated by the processor to:

determine if an indicated interfacing definition is stored in the repository;

retrieve the indicated interfacing definition from another computing device or a remote repository if the indicated interfacing definition is not stored in the repository; and receive or retrieve a new or updated interfacing definition from the other computing device or the remote repository for storage in the repository;

wherein each interfacing definition includes one or more data types allowed in a data representation language; and wherein each data type includes one or more structural or content constraints on a message written in the data representation language.

36. The computing device of claim 35, wherein the receiving or retrieving interfacing definitions between the computing device and the other computing device or the remote repository includes exchanging compiled versions of the interfacing definitions.

* * * * *